Figure 1:
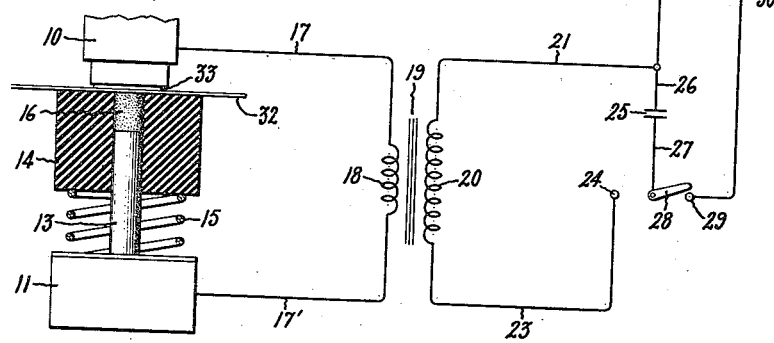

Nov. 21, 1939.  E. LEMMERS ET AL  2,180,988
ELECTRODE FOR ELECTRIC DISCHARGE DEVICES
Filed June 16, 1937

Inventors:
Eugene Lemmers,
George M. Carpenter,
by Harry E. Dunham
Their Attorney.

Patented Nov. 21, 1939

2,180,988

UNITED STATES PATENT OFFICE 2,180,988

ELECTRODE FOR ELECTRIC DISCHARGE DEVICES

Eugene Lemmers, Cleveland, and George M. Carpenter, Mentor, Ohio, assignors to General Electric Company, a corporation of New York Application June 16, 1937, Serial No. 148,488

4 Claims. (Cl. 250—27.5)

Our invention relates generally to electrodes for electric discharge devices and more particularly to electrodes of the type described and claimed in patent application Serial No. 16,614, Eugene Lemmers and Harry M. Fernberger, filed April 16, 1935, and comprising a body of highly porous refractory metal impregnated with an electron emissive material.

According to the above-mentioned application of Lemmers et al., a coarse refractory metal powder, such as tungsten, was first prepared and was then pressed and sintered to form an ingot or bar which was highly porous, over thirty per cent, for example. This material was then cut up and shaped into pellets or slugs of the desired size, a lead wire was spot welded thereto, and the pellet or slug was impregnated with an electron emissive material, such as barium oxide. This method produces very satisfactory electrodes but has the disadvantage of being comparatively expensive due to the amount of labor required in forming an electrode of the desired shape and size.

According to the present invention, the electrode is made by pouring into a suitably shaped mold or form a sufficient quantity of coarse refractory metal powder to make an electrode. Then, instead of sintering the metal particles by placing the mold in a furnace, the said particles are welded together electrically. The lead wire and other metallic parts are preferably united to the pellet or slug at the same time that the particles are spot welded together. The pellet or slug may then be impregnated with electron emissive material, or if desired, the electron emissive material may be mixed with the refractory metal powder prior to the welding operation. A pellet or slug formed in accordance with our invention has a different structure from one formed by the ordinary sintering process, the particles being welded to each other, whereas in electrodes made by sintering there is a recrystallization and interlocking of the crystals. The spot welding process is also much faster and electrodes may therefore be made much more cheaply. Moreover, it is possible to make highly coherent electrodes having even greater porosity than those made by sintering. Another advantage of this type of electrode is that when used in gaseous discharge lamps it has a lower starting voltage than other types of electrodes. Still another advantage is that it has an extremely high maintenance of emission throughout the life of the lamp.

Further features and advantages of our invention will appear from the following detailed description and from the drawing.

Figure 2:
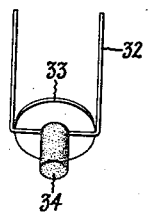

In the drawing, Fig. 1 is a somewhat diagrammatic elevation, partly in section, of a portion of an apparatus for making electrodes according to our invention and showing a welding circuit therefor, and Fig. 2 is a perspective view of a completed electrode.

Referring to the drawing, the apparatus shown in Fig. 1 comprises upper and lower electrodes 10 and 11 respectively, the lower electrode 11 having an upwardly extending rod or pin 13 secured thereto. A tubular mold or form 14, which may be made of an insulating ceramic material, such as beryllia, or of a metal lined with an insulating material, is supported around the upper end of the pin 13 by a spring 15. The tubular form 14 extends above the upper end of the pin 13 so that the powdered refractory metal 16 may be poured into the bore when the upper electrode 10 is removed.

For the welding operation, we prefer to employ a timed circuit having a high speed, preferably a condenser circuit as shown in the drawing. The electrode 10 is connected by a conductor 17 to one end of the secondary 18 of a transformer 19, and the electrode 11 is connected by a conductor 17' to the other end of said secondary. One end of the primary 20 of transformer 19 is connected by a conductor 21 to one side 22 of a source of direct current. The other end of said primary 20 is connected by a conductor 23 to a switch contact 24. A condenser 25, or a pile of condensers, is connected by conductor 26 to conductor 21 and by conductor 27 to a switch 28. Another switch contact 29 is connected by a conductor 30 to the other side 31 of the current source.

In making an electrode of tungsten, a coarse powder may be prepared by reducing ammonium tungstate crystals at 1000° C. to 1200° C. in a low current of hydrogen gas. The product thus produced is completely reduced tungsten powder of varying degrees of fineness. This product is then sieved and the 65 to 100 mesh powder is preferably employed, that is, the powder which passes through a 65 mesh sieve but not through a 100 mesh sieve. However, powders of 40 to 300 mesh size have been successfully employed.

The coarse tungsten powder is poured into the bore of the form 14, as shown at 16. The form of electrode shown in Fig. 2 is of the type shown in application Serial No. 102,554, Eugene Lemmers, filed September 25, 1936, and has a metal disc 33 and a lead wire 32 attached thereto.

After the powder 16 has been poured into the form 14, the wire 32 is placed on said form 14 across the bore therein and the disc 33 is placed on said wire. The electrode 10 is then brought down upon the form 14 to compress the powder 16, the said form moving down slightly against the action of spring 15. The said electrode is preferably urged against the form 14 and powder 16 by spring pressure.

The tungsten particles 16 are then welded together to form a porous pellet or slug 34 (Fig. 2) and at the same time, the lead wire 32 and disc 33 are spot welded thereto. The welding operation is performed by first throwing switch 28 into engagement with contact 29 to complete a circuit across the line terminals 22—31 through the condenser 25, to charge said condenser. The switch 28 is then thrown into engagement with contact 24 to complete the circuit through the primary 20 of transformer 19 and cause the condenser 25 to be discharged through said primary. The primary 20 induces a current of low voltage and high amperage in the secondary 18 which flows through conductor 17, electrode 10, disc 33, wire 32, powder 16, electrode 13—11 and conductor 17', thereby welding the particles 16 together to form the pellet 34 and, at the same time, welding the disc 33 and wire 32 thereto. To form a pellet 34 having a diameter of 4 mm. and a length of 3 mm., we prefer to charge 1000 microfarads to 600 volts and discharge it into a transformer 19 having an 18 to 1 ratio. Pellets formed in this manner from 60 to 100 mesh powder have a porosity of about 50 per cent, i. e., there is 50 per cent air space.

The electrode may be cleaned by heating it in hydrogen and then completed by impregnating the highly porous pellet 34 with an electron emissive material, for example, by soaking it in a compound which, upon subsequent heat treatment, yields an electron emissive material. Thus, the said pellet may be diped in an alkaline earth compound, such as molten barium hydroxide, which impregnates the pellet to a considerable depth. The electrodes may then be sealed into a glass envelope and heated, for example, by causing an arc discharge to strike therebetween, or by means of high frequency. The barium hydroxide breaks down into barium oxide, which remains in the pellets 34, and water vapor, which is removed from the envelope by evacuation. Various other compounds may be used, some of which impregnate the porous pellet 34 in molten condition, others from solution or suspension, and some from either state. Besides the hydroxide, other barium compounds which might be used are the nitrate, nitrite, iodide, formate, oxalate, acetate, and carbonate or other suspensions. The corresponding strontium compounds may be used with barium compounds if desired. The pellets may also be impregnated in other ways, such as by diffusion of the material therethrough in a powder or vapor state. The separate step of impregnating the pellets 34 may be eliminated by mixing the electron emissive material with the powder 16 before the welding operation or by placing a small lump or pellet of the material in the middle of the charge of powder 16.

Other refractory metals besides tungsten may be used in making the pellets 34, such, for example, as molybdenum or nickel. The said pellets may, or course, be made in any other desired shape, such, for example, as tubular. The disc 33 may, of course, be omitted and a portion of the lead wire 32 embedded in and welded directly to the pellet 34.

What we claim as new and desire to secure by Letters Patent of the United States is:

1. The method of making electrodes for electric discharge devices which comprises forming a highly porous body by compressing a quantity of coarse refractory metal particles and momentarily passing a heavy electric current through said particles to weld them together only at their contacting edges and impregnating said body with an electron emissive material.

2. The method of making electrodes for electric discharge devices which comprises forming a highly porous body by compressing a quantity of coarse refractory metal particles having an electron emissive material mixed therewith and momentarily passing a heavy electric current through said particles to weld them together only at their contacting edges and retain the said electron emissive material in the spaces between said particles.

3. The method of making electrodes for electric discharge devices which comprises introducing a quantity of coarse refractory metal particles into a form, momentarily passing a heavy electric current through said particles to weld them together only at their contacting edges and thereby form a highly porous body and impregnating said body with an electron emissive material.

4. The method of making electrodes for electric discharge devices which comprises introducing a quantity of coarse refractory metal particles into a form and in contact with a lead wire, momentarily passing a heavy electric current through said particles to weld them together only at their contacting edges and to said lead wire and thereby form a highly porous body and impregnating said body with an electron emissive material.

EUGENE LEMMERS.
GEORGE M. CARPENTER.